US012059382B2

(12) United States Patent
Tsukasako

(10) Patent No.: US 12,059,382 B2
(45) Date of Patent: *Aug. 13, 2024

(54) KNEE JOINT STIMULATION DEVICE

(71) Applicant: Takaaki Hino, Shimane (JP)

(72) Inventor: Kikunori Tsukasako, Hiroshima (JP)

(73) Assignee: Takaaki Hino, Ohchi-gun (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/835,686

(22) Filed: Jun. 8, 2022

(65) Prior Publication Data

US 2022/0313529 A1 Oct. 6, 2022

Related U.S. Application Data

(63) Continuation of application No. 16/487,821, filed as application No. PCT/JP2018/000410 on Jan. 11, 2018, now Pat. No. 11,389,365.

(30) Foreign Application Priority Data

Feb. 22, 2017 (JP) ................................ 2017-031212

(51) Int. Cl.
*A61H 1/02* (2006.01)

(52) U.S. Cl.
CPC ..... *A61H 1/024* (2013.01); *A61H 2201/0192* (2013.01); *A61H 2201/1215* (2013.01); *A61H 2201/1436* (2013.01); *A61H 2201/1642* (2013.01); *A61H 2201/1676* (2013.01); *A61H 2203/0431* (2013.01)

(58) Field of Classification Search
CPC ............ A61H 1/024; A61H 2201/0192; A61H 2201/1215; A61H 2201/1436; A61H 2201/1642; A61H 2201/1676; A61H 2203/0431
See application file for complete search history.

(56) References Cited

U.S. PATENT DOCUMENTS

| | | | | |
|---|---|---|---|---|
| 2,641,250 A * | 6/1953 | Brockman | A63B 23/12 | 601/36 |
| 3,774,597 A * | 11/1973 | Root | A61H 1/0237 | 601/27 |
| 4,566,440 A * | 1/1986 | Berner | A63B 21/00178 | 601/34 |
| 2002/0193210 A1* | 12/2002 | Turner | A63B 21/4047 | 482/80 |
| 2005/0164844 A1* | 7/2005 | Johnson | A63B 23/08 | 482/52 |

(Continued)

*Primary Examiner* — Timothy A Stanis
(74) *Attorney, Agent, or Firm* — METROLEX IP LAW GROUP, PLLC

(57) ABSTRACT

A knee joint stimulation device that can effectively stimulate a knee joint is composed of a base, a frame provided upright on the base, a center shaft provided at an upper part of the frame, a crank connecting a motor and the center shaft and driven by rotation of the motor, a swing arm hanging down perpendicularly from the center shaft, and a support plate unit provided at a lower end of the swing arm and allowing a user in a sitting position to put his/her sole thereon. With the user putting the sole on the support plate unit, the length of the swing arm is adjusted such that a pivot point of a knee joint of the user is aligned with the center shaft.

16 Claims, 7 Drawing Sheets

(56) References Cited

U.S. PATENT DOCUMENTS

| | | | | |
|---|---|---|---|---|
| 2014/0031728 | A1* | 1/2014 | Guillen | A61H 1/00<br>601/34 |
| 2015/0351990 | A1* | 12/2015 | Ewing | A61H 1/0244<br>601/5 |

* cited by examiner

KNEE JOINT STIMULATION DEVICE

This application is a continuation of application Ser. No. 16/487,821, filed on Aug. 21, 2019, which is a National Stage Application under 35 USC § 371 of PCT International Application No. PCT/JP2018/000410, which is based upon and claims the benefit of priority from the prior Japanese Patent Application No. 2017-031212, filed on Feb. 22, 2017, the entire contents of all of which are incorporated herein by reference.

TECHNICAL FIELD

The present invention relates to a knee joint stimulation device that can stimulate a knee joint without putting user's own weight.

BACKGROUND ART

The inventor has proposed a knee joint stimulation device (e.g., see PTL 1) composed of a motor mounted on a base, a pair of rails adjacent to the base, a slider sliding on the rails, and a crank connecting the motor and the slider. The crank is driven by rotation of the motor and causes the slider to slide along the rails. In use, a user in a sitting position with 90-degree knee flexion puts his/her sole on a support plate of the slider. The sliding movement moves the sole back and forth, and thereby causes extension and flexion of the knee joint.

In this knee joint stimulation device, the pair of rails having an arc-like curved shape enables the sole to follow the extension and flexion of the knee joint from 90 degrees while the user is in a sitting position.

CITATION LIST

Patent Literature

[PTL 1] JP 2016-131797 A

SUMMARY OF INVENTION

Technical Problem

In using this conventional knee joint stimulation device, a user needs to position the knee joint near the virtual center of the arc of the arc-like curved rails. Otherwise, the knee position is unstable, and the knee joint wobbles unsteadily in various directions during use.

Thus, it is difficult to use this conventional device properly in a correct setting. Those who have stiff joints in lower limbs (e.g., hip and knee joints), which is often the case with elderly persons, tend to use the device in a wrong setting. A wrongly set device causes the knee joint to move in various directions, and allows not only normal movements of the knee joint such as flexion and extension but also undesirable movements of the knee joint such as distortion and torsion. As a result, the device cannot stimulate the knee joint effectively.

Similarly, when the conventional device is used for rehabilitation to stimulate a stiff knee joint after recovery from injury or after surgery, wrong setting gives undesirable knee joint movements to a user.

For proper setting, a user is advised to consult a professional like an instructor or a trainer at a bone-setting clinic, a sport facility or the like, which is costly and inconvenient.

Besides, since the device needs resetting for each user, it is difficult and troublesome to share the device in the family or the like.

In consideration of the above-described situations, the present invention intends to provide a knee joint stimulation device that can stimulate a knee joint properly and effectively in a simple setting.

Solution to Problem

To solve the above-mentioned problems, a knee joint stimulation device according to the present invention includes a base, a frame provided upright on the base, a center shaft provided at an upper part of the frame, a crank connecting a motor and the center shaft and driven by rotation of the motor, the center shaft being pivotable via the crank, a swing arm hanging down perpendicularly from the center shaft, a length of the swing arm being adjustable, and a support plate unit provided at a lower end of the swing arm and allowing a user in a sitting position to put a sole of the user thereon. With the user putting the sole on the support plate unit, the length of the swing arm is adjusted such that a pivot point of a knee joint of the user is aligned with the center shaft. By swinging movement of the swing arm, the support plate unit can move the sole resting thereon in a flexion direction or an extension direction about the knee joint. The support plate unit is pivotable about a support shaft that horizontally extends from the lower end of the swing arm. Even when the sole resting on the support plate unit moves in a flexion direction or an extension direction about the knee joint and thereby an ankle joint is caused to move in a plantarflexion direction and a dorsiflexion direction, the support plate unit can pivotally follow the movement of the sole.

In this knee joint stimulation device, the support plate unit may be large enough to hold one sole of the user or to hold both soles of the user side by side.

To solve the above-mentioned problems, a knee joint stimulation device according to the present invention includes a base, a frame provided upright on the base, a center shaft provided at an upper part of the frame, a crank connecting a motor and the center shaft and driven by rotation of the motor, the center shaft being pivotable via the crank, a pair of swing arms hanging down perpendicularly from both sides of the center shaft across the motor, a length of the swing arms being adjustable, and a pair of support plate units provided at lower ends of the pair of swing arms and allowing a user in a sitting position to put soles of the user thereon. With the user putting the soles on the support plate units, the length of the swing arms is adjusted such that pivot points of knee joints of the user are aligned with the center shaft. By swinging movement of the swing arms, the support plate units can move the soles resting thereon in a flexion direction or an extension direction about the knee joints. The support plate units are pivotable about support shafts that horizontally extend from the lower ends of the swing arms. Even when the soles resting on the support plate units move in a flexion direction or an extension direction about the knee joints and thereby ankle joints are caused to move in a plantarflexion direction and a dorsiflexion direction, the support plate units can pivotally follow the movement of the soles.

In this knee joint stimulation device, the support plate unit may be fixed at an attachment angle orthogonal to a lengthwise direction of the swing arm such that the support plate unit remains horizontal while the swing arm hangs down perpendicularly, and the support plate unit may swing about the center shaft along an arc-like path.

In this knee joint stimulation device, the support plate unit may be attached to the support shaft at an attachment angle orthogonal to a lengthwise direction of the swing arm. A stabilizer may be provided between the support shaft and the support plate unit. When the attachment angle is likely to change, the stabilizer may resist the change and keeps the attachment angle constant.

In this knee joint stimulation device, the center shaft may protrude in such a manner as to abut on a pivot point of the knee joint when the user puts the sole on the support plate unit. With the center shaft being aligned with the pivot point of the knee joint, the support plate unit may move the sole in a flexion direction or an extension direction about the knee joint.

Advantageous Effects of Invention

As described above, the knee joint stimulation device according to the present invention can prevent the knee joint from wobbling unsteadily in various directions when the sole resting on the support plate unit is caused to move in a flexion direction or an extension direction about the knee joint, by a simple procedure of adjusting the length of the swing arm and thereby aligning the pivot point of user's knee joint with the center shaft that is a pivot point of the swing arm. Hence, the knee joint stimulation device can stimulate a knee joint properly and effectively in a simple setting, without causing undesirable movements of the knee joint.

DESCRIPTION OF EMBODIMENTS

Hereinafter, embodiments of the present invention are described with reference to the drawings.

Figure 1:
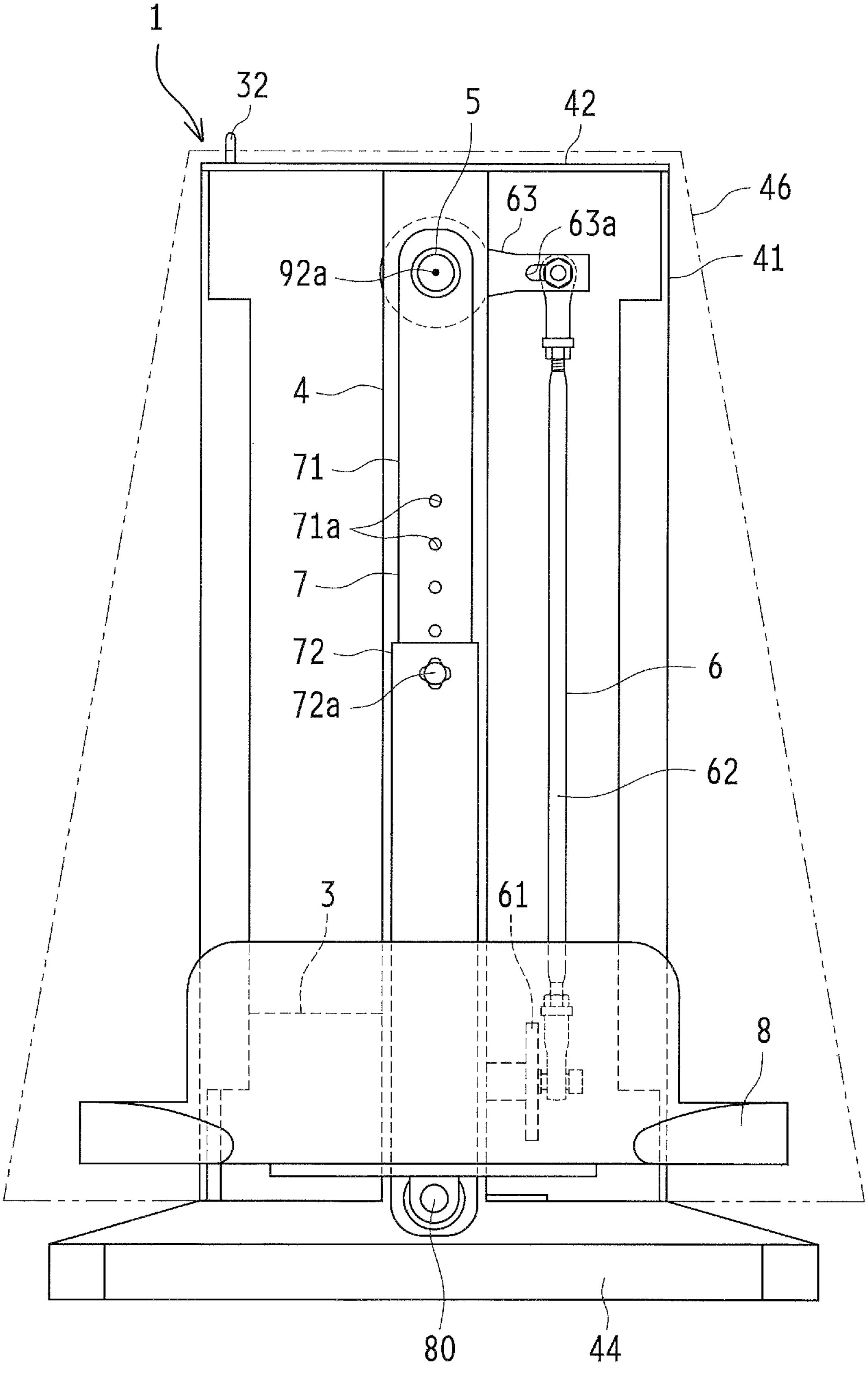
FIG. 1 is a schematic side view showing an overall configuration of a knee joint stimulation device according to the present invention.
Figure 2:
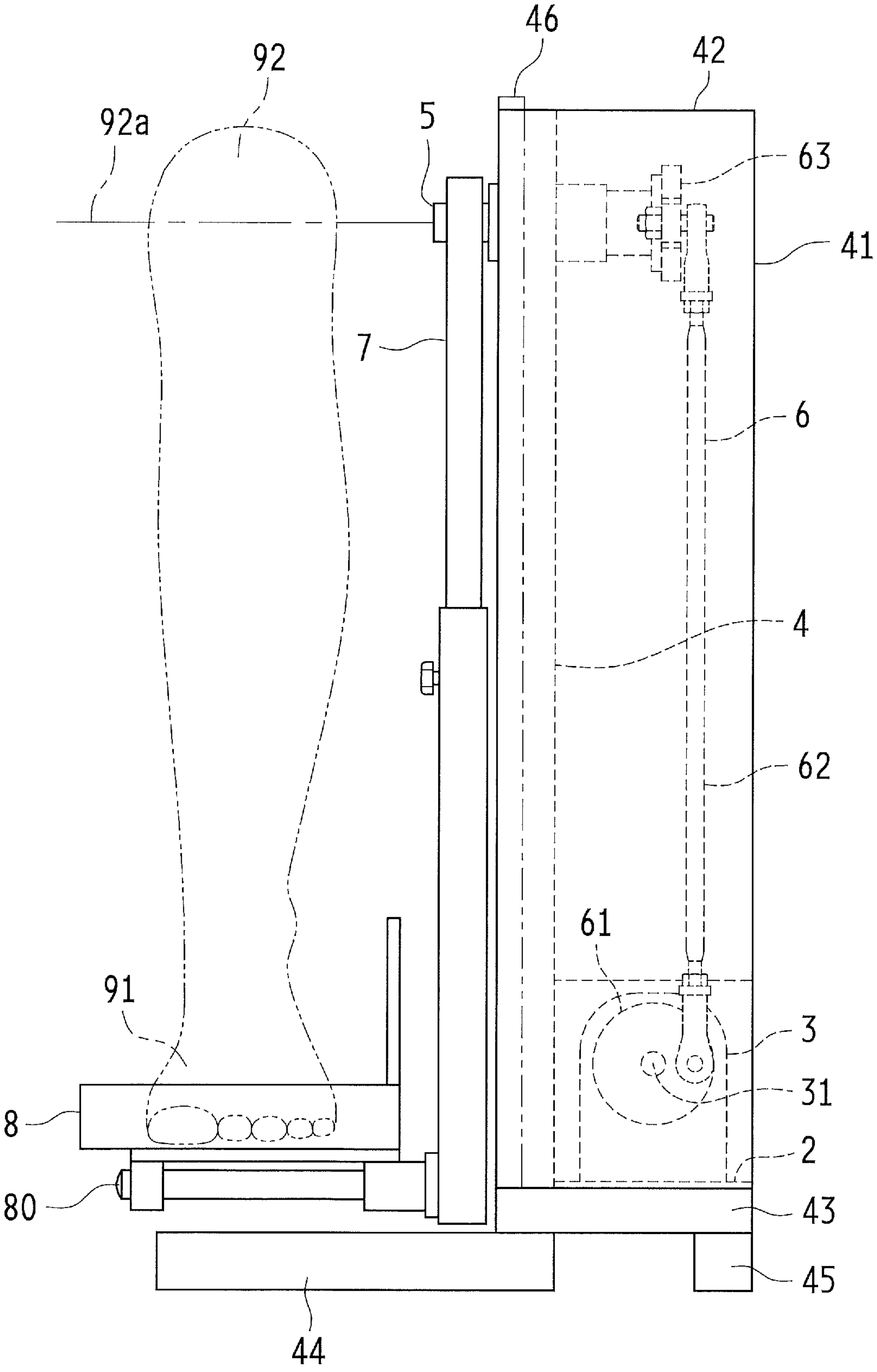
FIG. 2 is a schematic front view showing an overall configuration of the knee joint stimulation device according to the present invention.
Figure 3:
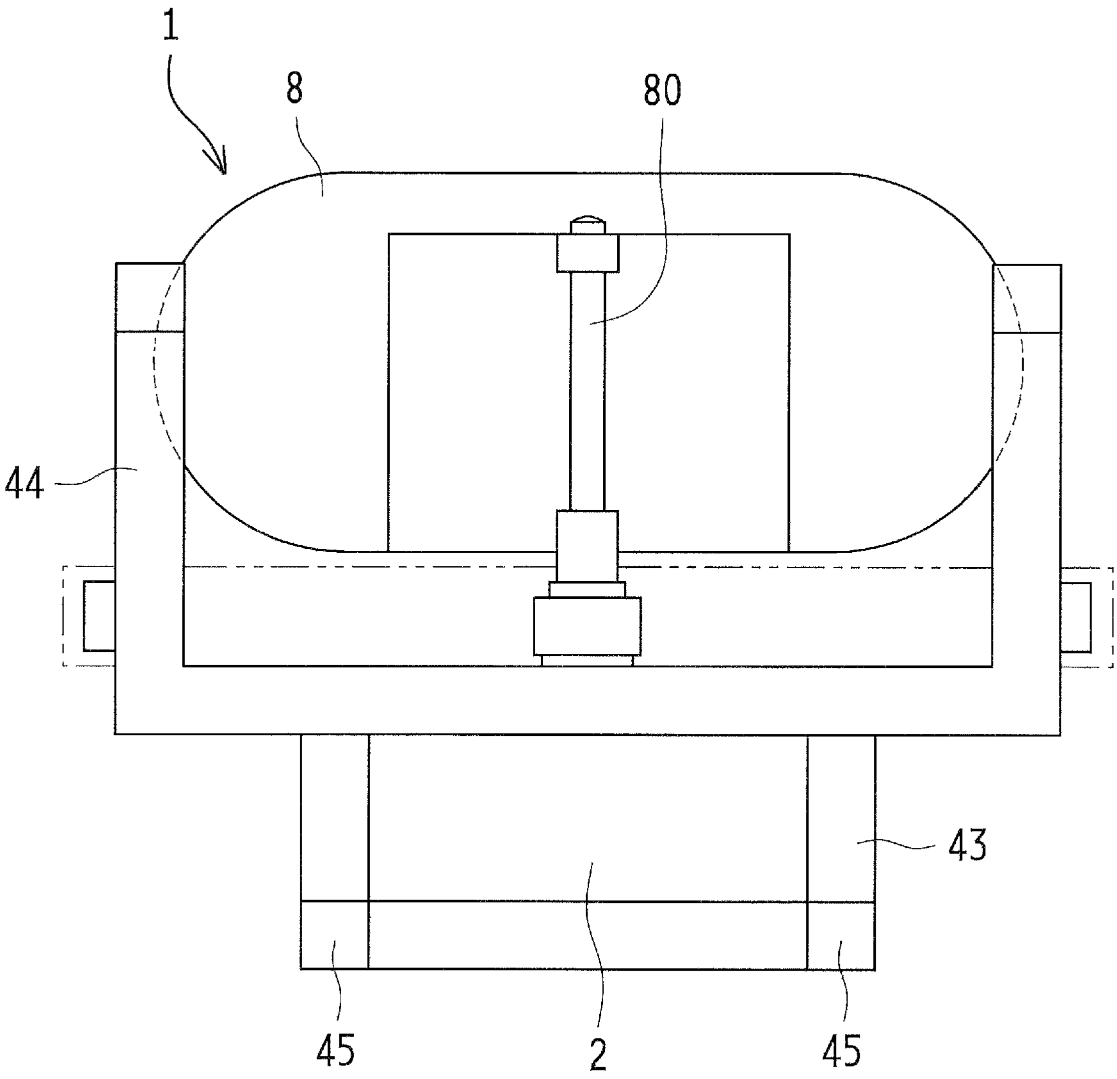
FIG. 3 is a schematic bottom view showing an overall configuration of the knee joint stimulation device according to the present invention.
Figure 4:
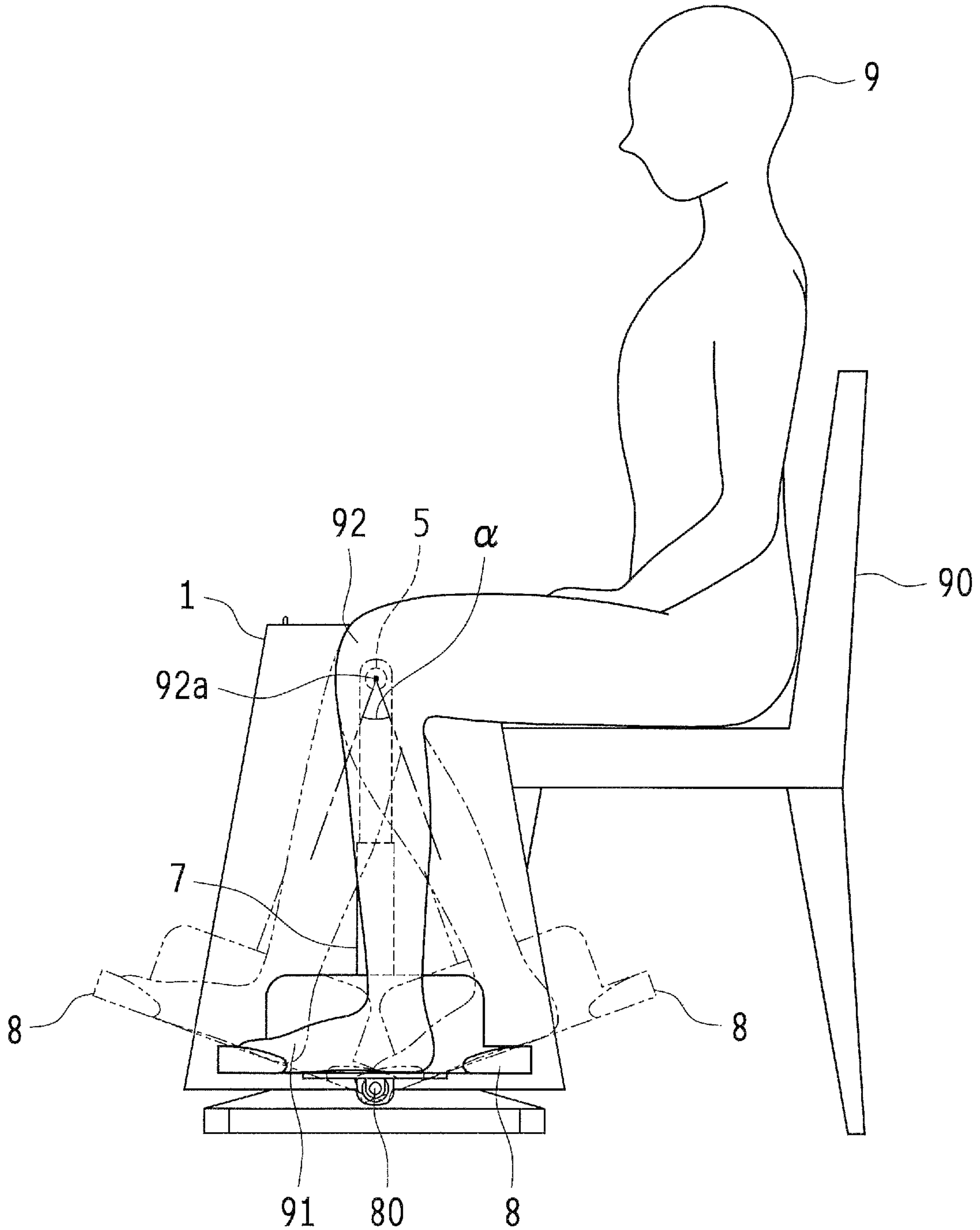
FIG. 4 is a side view, in use, of the knee joint stimulation device according to the present invention.

FIGS. 1 to 3 show a knee joint stimulation device 1 according to the present invention. FIG. 4 shows the knee joint stimulation device 1 in use.

The knee joint stimulation device 1 is composed of a base 2, a motor 3 and a frame 4 provided thereon, a center shaft 5 provided at an upper part of the frame 4, a crank 6 connecting the motor 3 and the center shaft 5 and driven by rotation of the motor 3, the center shaft 5 being pivotable via the crank 6, a length-adjustable swing arm 7 that hangs down perpendicularly from the center shaft 5, and a support plate unit 8 provided at a lower end of the swing arm 7. With a user 9 in a sitting position putting his/her sole 91 on the support plate unit 8, the length of the swing arm 7 is adjusted such that the pivot point 92*a* of a knee joint 92 of the user 9 is aligned with the center shaft 5. By swinging movement of the swing arm 7, the support plate unit 8 can move the sole 91 resting thereon in a flexion direction or an extension direction about the knee joint 92.

The base 2 has a plate-like shape that is large enough to hold the motor 3 in a stable manner. The motor 3 is fixed at a central part of the base 2.

The motor 3 has a rotation axis 31 equipped with a rotating plate 61. A first end of a crankshaft 62 is eccentrically fixed to the rotating plate 61 near a circumference thereof, such that the crankshaft 62 is rotatable with the rotating plate 61.

The frame 4 is made of an angular steel member having a rectangular cross section, and stands upright at a central part on one side of the base 2. On the other three sides of the base 2, a housing 41 having a lip channel-shaped cross section stands upright to protect the frame 4. A lid 42 is provided at an upper end of the housing 41. The lid 42 is fixedly welded to the upper end of the frame 4. The frame 4 on the base 2 is covered and protected by the housing 41 and the lid 42. A rectangular frame member 43 reinforces the bottom of the base 2. An angular U-shaped support frame 44 lies adjacent to the frame member 43, and supports the swinging movement of the swing arm 7 to be described later. A foot 45 is provided at the bottom of the frame member 43 so as to be level with the support frame 44. Additionally, a cover member 46 provided between the housing 41 and the swing arm 7 hides the inside of the housing 41.

The center shaft 5 horizontally penetrates the upper part of the frame 4, and is pivotable relative to the frame 4. A first end of the center shaft 5 protrudes internally into a space covered by the housing 41, the lid 42 and the cover member 46, namely, a space straight above the motor 3 provided on the base 2. A second end of the center shaft 5 protrudes externally out of the space covered by the housing 41, the lid 42 and the cover member 46.

The crank 6 is provided between the motor 3 and the center shaft 5, and is configured to convert the rotational movement of the motor 3 to the pivotal movement of the center shaft 5. For this configuration, a pivot plate 63 is attached to the center shaft 5. The pivot plate 63 is composed of a circular portion and an arm portion extending from an outer periphery of the circular portion, with a slot 63*a* formed in the arm portion. With the rotating plate 61 attached to the motor 3, a first end of the crankshaft 62 is eccentrically fixed to the rotating plate 61 near a circumference thereof, such that the crankshaft 62 is rotatable with the rotating plate 61. A second end of the crankshaft 62 is pivotally fixed to the pivot plate 63. This crankshaft 62 moves up and down in response to the rotational movement of the motor 3. The up-down movement of the crankshaft 62 causes pivotal movement of the pivot plate 63 via the arm portion, which in turn causes the pivotal movement of the center shaft 5.

During this process, the slot 63*a* in the arm portion enables the second end of the crankshaft 62 to follow a phase change at the first end of the crankshaft 62 that moves with the rotation of the rotating plate 61. The second end of the crankshaft 62 is pivotally fixed to a proper position in the pivot plate 63 for desired pivotal movement of the center shaft 5. If the position of fixing the second end of the crankshaft 62 in the slot 63*a* is closer to the center shaft 5, the pivotal movement of the center shaft 5 is greater, which increases the swing width of the swing arm 7 to be described later. If the position of fixing the second end of the crankshaft 62 in the slot 63*a* is farther away from the center shaft 5, the pivotal movement of the center shaft 5 is smaller, which decreases the swing width of the swing arm 7. Given that the angle of the knee joint 92 changes about 15 degrees while walking, the pivotal movement of the center shaft 5 preferably corresponds to this angle change. To change the angle of the knee joint 92 by about 15 degrees in this embodiment, it is preferable to extend the knee joint in one direction from 90 degrees to 97.5 degrees in the sitting position and to flex the knee joint in the opposite direction from 90 degrees to 82.5 degrees in the sitting position. Repetition of such extension and flexion is desirable to provide an angle of movement a of about 15 degrees.

Having said that, the angle change should not be particularly limited to about 15 degrees that corresponds to the angle change at the knee joint 92 while walking. If mobility of the knee joint 92 has improved through rehabilitation or the like, the position of attaching the second end of the crankshaft 62 in the slot 63*a* may be closer to the center shaft 5 so as to expand the pivotal movement and to increase the angle of movement a.

The swing arm 7 hangs down perpendicularly, with its upper end being fixed to the second end of the center shaft 5. The swing arm 7 has a telescopic structure composed of a pair of steel members. A male member 71 includes a plurality of bores 71*a* for adjustment of the length of the swing arm 7, formed at a predetermined interval. A female member 72 of the swing arm 7 has a pin 72*a* that is insertable into any of the bores 71*a* in the male member 71. The pin 72*a* urges the female member 72 from outside toward a selected bore 71*a* in the male member 71. To adjust the length of the swing arm 7, the pin 72*a* is pulled out of the bore 71*a* in the male member 71 against the urging force of the pin 72*a*. With the pin 72*a* being pulled, the length is adjusted to a predetermined length. Thereafter, the pin 72*a* that has been pulled is released and inserted in a bore 71*a* in the male member 71. At the lower end of the swing arm 7 opposite to the center shaft 5, a support shaft 80 extends horizontally.

In the above description, the swing arm 7 is adjustable by insertion of the pin 72*a* of the female member 72 into one of the bores 71*a* in the male member 71. However, the manner of adjusting the swing arm 7 is not particularly limited and may be different. For example, the swing arm 7 having no bores 71*a* in the male member 71 may be adjusted to a desired length, irrespective of the positions of the bores 71*a*, by pressing an extreme end of the pin 72*a* against the male member 71. Any other structure common to this type of length adjustment is also applicable.

The support plate unit 8 has a long plate-like shape on which the user 9 can put his/her sole 91. The support plate unit 8 is pivotally arranged on the support shaft 80 such that the support shaft 80 extends widthwise across a central part on the bottom surface of the support plate unit 8. The support plate unit 8 is thus configured to swing about the center shaft 5, with a radius of swing being the length of the swing arm 7. Hence, with the user 9 putting his/her sole 91 on the support plate unit 8, the length of the swing arm 7 is adjusted such that the pivot point 92*a* of the knee joint 92 is aligned with the center shaft 5. Owing to this adjustment, swinging movement of the support plate unit 8 moves a lower thigh of the user 9 in a flexion direction or an extension direction about the knee joint 92. Since the knee joint 92 is aligned with the center shaft 5 attached to the swing arm 7, the device can prevent the knee joint 92 from wobbling unsteadily in various directions.

In using this knee joint stimulation device 1, a power source of the motor 3 is plugged in (not shown), and a start switch 32 of the motor 3 on the outside of the housing 41 is turned on/off to drive the motor 3. The driving force is transmitted from the center shaft 5 via the crank 6 to the swing arm 7, and causes swinging movement of the support plate unit 8.

The thus configured knee joint stimulation device 1 is used in the following manner.

As shown in FIG. 4, a chair 90 is positioned such that the user 9 is in a sitting position with 90-degree knee flexion and puts his/her sole 91 on the support plate unit 8 of the knee joint stimulation device 1. With the user 9 in a sitting position with 90-degree knee flexion putting the sole 91 on the support plate unit 8, the length of the swing arm 7 is adjusted such that the pivot point 92*a* of the knee joint 92 of the user 9 is aligned with the center shaft 5 attached to the swing arm 7.

After the setting is done, the start switch 32 is turned on to power the motor 3 and to initiate the movement. While the motor 3 is in operation, the swing arm 7 and the support plate unit 8 swing about the center shaft 5 via the crank 6. While the user 9 in a sitting position with 90-degree knee flexion puts his/her sole 91 on the support plate unit 8, the swinging movement causes the knee joint 92 to extend from 90 degrees and to flex back to 90 degrees and even further in a flexion direction. Repetition of the extension and flexion within the range of a prescribed angle of movement a stimulates the knee joint 92 by passive movement using the motor 3.

As described above, the length of the swing arm 7 is adjusted such that the pivot point 92*a* of the knee joint 92 is aligned with the center shaft 5 attached to the swing arm 7, with the user 9 in a sitting position with 90-degree knee flexion putting the sole 91 on the support plate unit 8. Hence, the device can prevent the knee joint 92 of the user 9 from unsteadily wobbling in various directions. Eventually, the device can serve for rehabilitation to restore normal flexion and extension of the knee joint 92 without causing undesirable movements of the knee joint 92 such as distortion or torsion. This effect is achieved by a simple procedure of adjusting the length of the swing arm 7 and thereby aligning the pivot point 92*a* of the knee joint 92 with the center shaft 5. Even if the user 9 has a stiff ankle joint that does not plantarflex and dorsiflex smoothly and cannot coordinate plantarflexion and dorsiflexion of the ankle joint with flexion and extension of the knee joint 92, the support plate unit 8 that is pivotably attached to the support shaft 80 enables smooth flexion and extension of the knee joint 92, with the sole 91 resting on the support plate unit 8.

However, during the flexion and extension of the knee joint 92, the support plate unit 8 that pivots easily about the support shaft 80 may cause the ankle joint to strain and tighten needlessly in order to avoid unintended movement of the support plate unit 8 in a plantarflexion direction or a dorsiflexion direction. Hence, for some users, the support plate unit 8 may be directly fixed to the swing arm 7 without being held by the support shaft 80. For other users, the support plate unit 8 may be fixed to the support shaft 80 so as not to pivot about the support shaft 80. Such measures limit the angle of the ankle joint during the flexion and extension of the knee joint 92, but can prevent the ankle joint from getting unstable and tense.

Figure 5A:
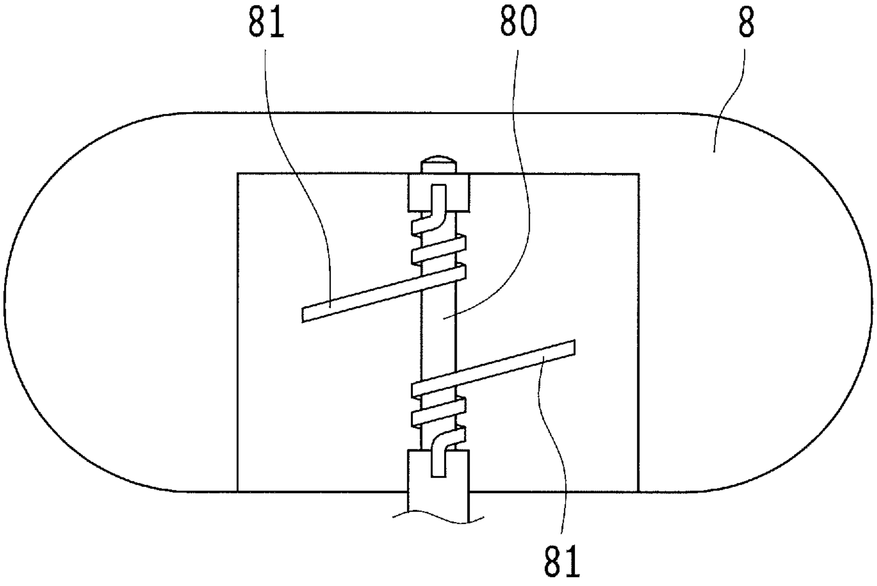
FIGS. 5A and 5B are a bottom view and a side view, respectively, showing another manner of attaching the support plate unit for the knee joint stimulation device according to the present invention.
Figure 5B:
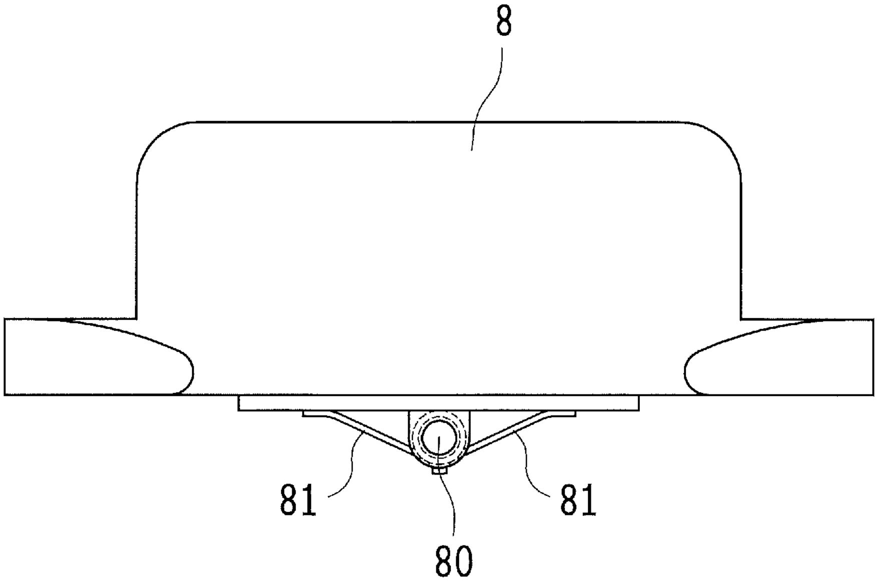

FIG. 5 shows an optional stabilizer 81. The stabilizer 81 keeps an attachment angle of the support plate unit 8 relative to the support shaft 80, with the swing arm 7 hanging down perpendicularly, such that a sole resting surface of the support plate unit 8 for the sole 91 is orthogonal to the lengthwise direction of the swing arm 7 (namely, the sole resting surface is horizontal while the swing arm 7 hangs down perpendicularly). While the user 9 puts his/her sole 91 on the sole resting surface, movement of the ankle joint in a plantarflexion direction or a dorsiflexion direction is likely to change the attachment angle. The stabilizer 81 resists such a change and brings the attachment angle back to the original attachment angle. The stabilizer 81 may be a spring that is wound around the support shaft 80 fixed to the swing arm 7, with an end of the spring being fixed to the support shaft 80 and the other end being fixed to the bottom surface of the support plate unit 8 in a supporting manner. Alternatively, the stabilizer 81 may be an oil damper, an air damper, or an elastic member (a spring, an elastomer, etc.) provided between the swing arm 7 and the support plate unit 8 or between the support shaft 80 and the support plate unit 8.

Unlike the case where the support plate unit 8 is fixed directly to the swing arm 7, the stabilizer 81 avoids limitation to the angle of the ankle joint during the flexion and extension of the knee joint 92. The stabilizer 81 also avoids easy pivoting of the support plate unit 8, and thereby prevents needless straining and tightening of the ankle joint. Accordingly, the user 9 can flex and extend the knee joint 92 smoothly in a relaxed manner by passive movement.

Figure 6A:
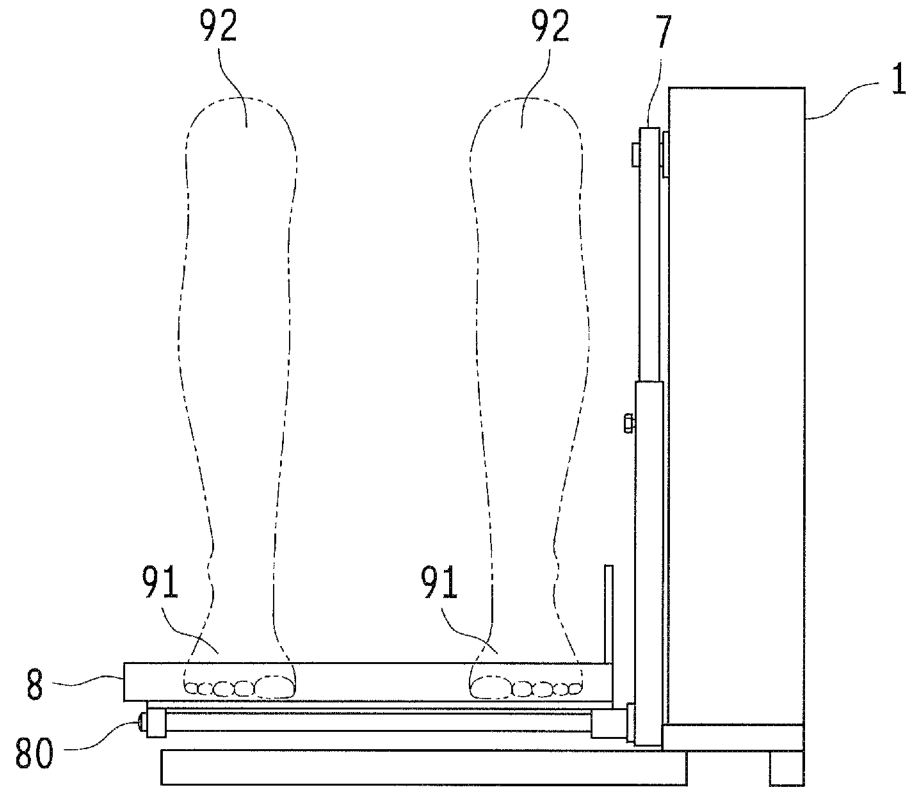
FIGS. 6A and 6B are schematic front views showing other embodiments of the knee joint stimulation device according to the present invention.
Figure 6B:
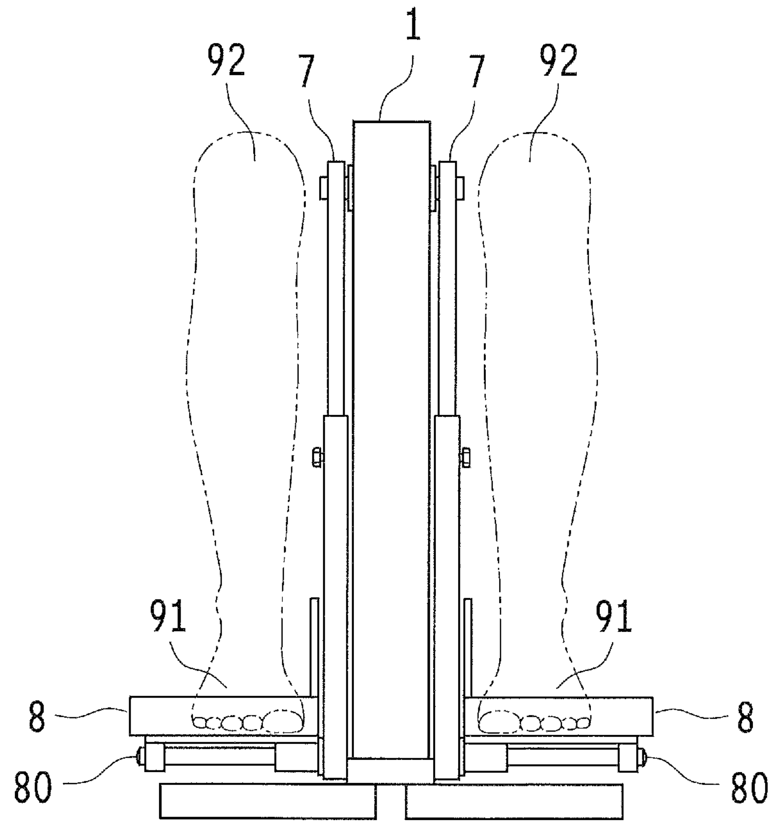

The knee joint stimulation device 1 in this embodiment is designed for use with one foot at a time. Alternatively, as shown in FIG. 6A, the knee joint stimulation device 1 may be arranged for use with both feet together by making the support plate unit 8 large enough to hold both feet. Further, as shown in FIG. 6B, the knee joint stimulation device 1 may be arranged for use with both feet at a time by having a pair of swing arms 7 and a pair of support plate units 8 on each side of the motor 3 such that each support plate unit holds a foot. In the latter case, the feet may be flexed and extended simultaneously in the same direction or in alternating directions. In the knee joint stimulation device 1 shown in FIG. 6A, the support plate unit 8 may be cantilevered by a single swing arm 7. Alternatively, another swing arm 7 may be provided on the free side to hold the support plate unit 8 on both sides. If the support plate unit 8 is held on both sides by such swing arms 7, the driving force from the motor 3 may be transmitted to both sides of the support plate unit 8 or to one side thereof.

The knee joint stimulation device 1 stimulates the knee joint 92 by passive movement while a user in a sitting position rests a body part below the knee joint 92 on the support plate unit 8. Hence, the knee joint 92 does not receive the full weight of the user 9, unlike when the user 9 is walking. Thus, those who have stiff knee joints 92, such as elderly persons, rehabilitants after surgery, and patients with knee osteoarthritis, can move the knee joint 92 smoothly by passive movement.

Use of the motor 3 enables passive movement in a steady rhythm, and such passive movement is expected to provide a massage effect.

Instead of the start switch 32, the motor 3 may have a volume switch (not shown) that controls the rotation of the motor 3 and that can thereby adjust the swing speed of the swing arm 7 and the support plate unit 8.

Figure 7:
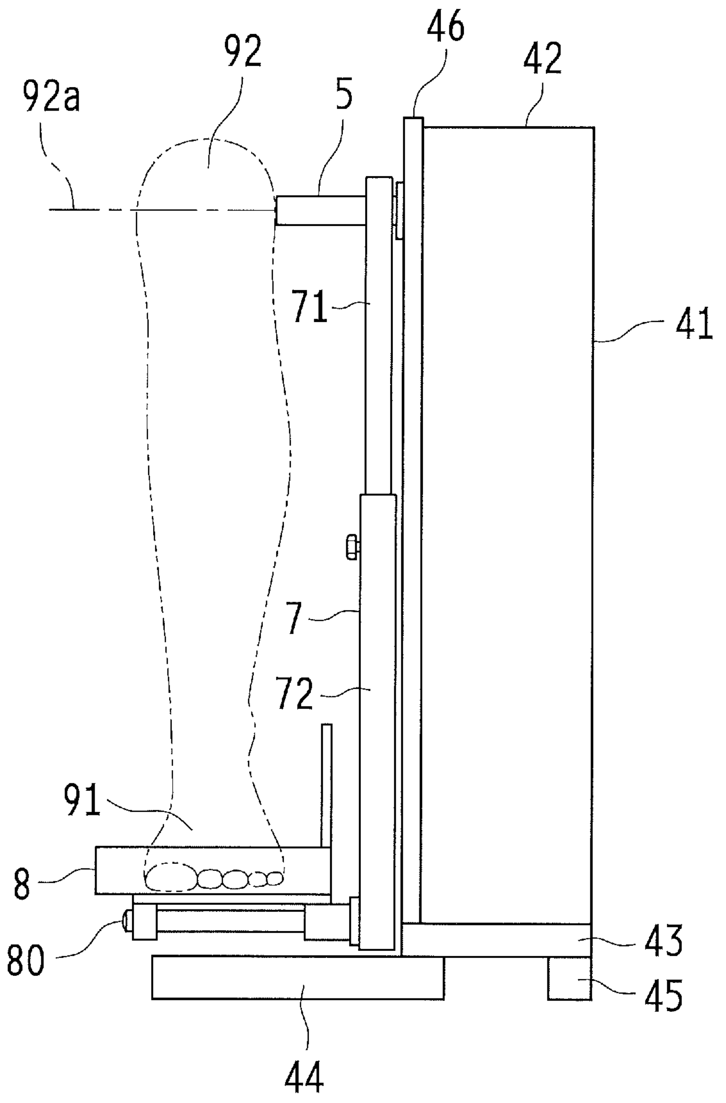
FIG. 7 is a front view showing yet another embodiment of the knee joint stimulation device according to the present invention.

In the knee joint stimulation device 1 of this embodiment, an improper Q factor may cause pain at the knee joint 92 if the user 9 puts his/her sole 91 on the support plate unit 8 but the knee joint 92 is positioned too inward or outward from the point straight above the support plate unit 8. FIG. 7 shows an arrangement for proper setting of the lateral position of the knee joint 92. As illustrated, the center shaft 5 protrudes long enough to position the knee joint 92 straight above the sole 91 properly, with the outer side of the knee joint 92 (in the case of FIG. 6B, the inner side of the knee joints 92) abutting on the protrusion. To prevent pain at the knee joint 92 due to an improper Q factor in the knee joint stimulation device 1 shown in FIG. 6A, the support plate unit 8 is preferably large enough to put both feet at an interval equivalent to the width of the hip joints of the user 9. To be specific, a sufficient size of the support plate unit 8 is substantially equal to the width of the seat of the chair 90.

The present invention can be embodied and practiced in other different forms without departing from the spirit and essential characteristics of the present invention. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

REFERENCE SIGNS LIST

1 knee joint stimulation device
2 base
3 motor
4 frame
5 center shaft
6 crank
7 swing arm
8 support plate unit
80 support shaft
81 stabilizer
9 user
91 sole
92 knee joint
92*a* pivot point

The invention claimed is:

1. A knee joint stimulation device comprising:
a base;
a frame provided upright on the base;
a center shaft provided at an upper part of the frame and extending a widthwise direction;
a crank connecting a motor and the center shaft and configured to be driven by rotation of the motor, to rotate the center shaft;
a swing arm hanging down perpendicularly from the center shaft, a length of the swing arm being adjustable; and
a support plate unit provided at a lower end of the swing arm and allowing a user in a sitting position to put a sole of the user thereon,
wherein the length of the swing arm is configured to be adjusted such that a pivot point of a knee joint of the user in the sitting position and putting the sole on the support plate unit is aligned with the center shaft,
wherein the support plate unit is configured, by swinging movement of the swing arm about the center shaft, to move the sole resting thereon in a flexion direction or an extension direction about the knee joint, and
wherein the support plate unit is pivotably attached on a support shaft that horizontally extends in the widthwise direction from the lower end of the swing arm across a central part of a bottom surface of the support plate unit so as to be pivotable about the support shaft such that the support plate unit is configured to pivotally follow the movement of the sole even when the sole resting on the support plate unit moves in the flexion direction or the extension direction about the knee joint and thereby an ankle joint is caused to move in a plantarflexion direction and a dorsiflexion direction.

2. The knee joint stimulation device according to claim 1, wherein the support plate unit is large enough to hold one sole of the user or to hold both soles of the user side by side.

3. The knee joint stimulation device according to claim 2, wherein the support plate unit is attached to the support shaft at an attachment angle orthogonal to a lengthwise direction of the swing arm, and wherein a stabilizer is provided between the support shaft and the support plate unit, and is configured to bias the support plate unit to keep the attachment angle constant.

4. The knee joint stimulation device according to claim 2, wherein the center shaft is protruded from the swing arm so as to abut on the pivot point of the knee joint of the user in the sitting position and putting the sole on the support plate unit, such that the support plate unit is configured to move the sole in the flexion direction or the extension direction about the knee joint with the center shaft being aligned with the pivot point of the knee joint.

5. The knee joint stimulation device according to claim 2, wherein the support plate unit is provided at the lower end of the swing arm and allowing the user in the sitting position to put the soles of the user thereon, without a pair of members that sandwiches therebetween a portion of a lower limb of the user below the knee joint.

6. The knee joint stimulation device according to claim 1, wherein the support plate unit is attached to the support shaft at an attachment angle orthogonal to a lengthwise direction of the swing arm, and wherein a stabilizer is provided between the support shaft and the support plate unit, and is configured to bias the support plate unit to keep the attachment angle constant.

7. The knee joint stimulation device according to claim 1, wherein the center shaft is protruded from the swing arm so as to abut on the pivot point of the knee joint of the user in the sitting position and putting the sole on the support plate unit, such that the support plate unit is configured to move the sole in the flexion direction or the extension direction about the knee joint with the center shaft being aligned with the pivot point of the knee joint.

8. The knee joint stimulation device according to claim 1, wherein the support plate unit is provided at the lower end of the swing arm and allowing the user in the sitting position to put the sole of the user thereon, without a pair of members that sandwiches therebetween a portion of a lower limb of the user below the knee joint.

9. The knee joint stimulation device according to claim 1, wherein the support shaft is provided below the bottom surface of the support plate unit.

10. The knee joint stimulation device according to claim 1, wherein the support plate unit is pivotably provided at the lower end of the swing arm without a bias member that biases the support plate with respect to the swing arm about the support shaft in a direction to move the ankle joint in the dorsiflexion direction.

11. A knee joint stimulation device comprising:

a base;

a frame provided upright on the base;

a center shaft provided at an upper part of the frame and extending a widthwise direction;

a crank connecting a motor and the center shaft and configured to be driven by rotation of the motor, to rotate the center shaft;

a pair of swing arms hanging down perpendicularly from both sides of the center shaft across the motor, a length of the swing arms being adjustable; and a pair of support plate units provided at lower ends of the swing arms and allowing a user in a sitting position to put soles of the user thereon, wherein the length of the swing arms is configured to be adjusted such that pivot points of knee joints of the user in the sitting position and putting the soles on the support plate units are aligned with the center shaft, wherein the support plate units are configured, by swinging movement of the swing arms about the center shaft, to move the soles resting thereon in a flexion direction or an extension direction about the knee joints, wherein the support plate units are pivotably attached on support shafts that horizontally extend from the lower ends of the swing arms across central parts of bottom surfaces of the support plate units so as to be pivotable about the support shaft such that the support plate units are configured to pivotally follow the movement of the soles even when the soles resting on the support plate units move in the flexion direction or the extension direction about the knee joints and thereby ankle joints are caused to move in a plantarflexion direction and a dorsiflexion direction.

12. The knee joint stimulation device according to claim 11, wherein the support plate units are attached to the support shafts at an attachment angle orthogonal to a lengthwise direction of the swing arms, and wherein stabilizers are provided between the support shafts and the support plate units, and are configured to bias the support plate units to keep the attachment angle constant.

13. The knee joint stimulation device according to claim 11, wherein the center shaft is protruded from the swing arms so as to abut on the pivot points of the knee joints of the user in the sitting position and putting the soles on the support plate units, such that the support plate units are configured to move the soles in the flexion direction or the extension direction about the knee joints with the center shaft being aligned with the pivot points of the knee joints.

14. The knee joint stimulation device according to claim 11, wherein the support plate units are provided at the lower ends of the swing arms and allowing the user in the sitting position to put the soles of the user thereon, without a pair of members that sandwiches therebetween a portion of a lower limb of the user below the knee joint.

15. The knee joint stimulation device according to claim 11, wherein the support shafts are provided below the bottom surfaces of the support plate units.

16. The knee joint stimulation device according to claim 11, wherein the support plate units are pivotably provided at the lower ends of the swing arms without bias members that bias the support plates with respect to the swing arms about the support shafts in a direction to move the ankle joints in the dorsiflexion direction.

* * * * *